(12) United States Patent
Bartlett

(10) Patent No.: US 6,282,039 B1
(45) Date of Patent: Aug. 28, 2001

(54) SCRATCH PROTECTION IN TAPE DATA STORAGE SYSTEM

(75) Inventor: Paul Frederick Bartlett, Boise, ID (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/182,444

(22) Filed: Oct. 30, 1998

(30) Foreign Application Priority Data

Oct. 31, 1997 (EP) .................................. 97308765

(51) Int. Cl.[7] ........................................ G11B 5/09

(52) U.S. Cl. ........................ 360/48; 360/47; 360/53; 714/6; 714/701

(58) Field of Search .................. 360/47, 48, 53, 360/134; 714/6, 701

(56) References Cited

U.S. PATENT DOCUMENTS

| | | | | |
|---|---|---|---|---|
| 4,829,525 | * | 5/1989 | Sugiyama et al. | 714/758 |
| 5,467,360 | * | 11/1995 | Lokhoff | 714/755 |
| 5,485,321 | * | 1/1996 | Leonhardt et al. | 360/48 |
| 5,491,590 | * | 2/1996 | Endo et al. | 360/32 X |

FOREIGN PATENT DOCUMENTS

| | | |
|---|---|---|
| 0437865A1 | 7/1991 | (EP) . |
| WO96/20474 | 7/1996 | (WO) . |
| WO97/04454 | 2/1997 | (WO) . |

OTHER PUBLICATIONS

A High Capacity, High Performance, Small Form Factor Magnetic Tape Storage System, by William D. Doyle (for the MCR Development Team) *IEEE Transactions on Magnetics*; vol. 26, No. 5, Sep. 1990, pp. 2152–2156.

* cited by examiner

Primary Examiner—Alan T. Faber

(57) ABSTRACT

A method of redundancy coding of user data received from a host apparatus and storage of said coded data on a magnetic tape data storage medium comprises inputting a byte stream of user data into a buffer and assembling a plurality of data sets in the buffer; for each data set assembling a data set into a two-dimensional data array and (1103) applying a second redundancy coding algorithm (C2 parity) to the two-dimensional data set in a second dimension; applying (1105) a first redundancy coding (C1 parity) algorithm to the second redundancy coded data array in a first dimension to form a two-dimensional data frame having second and first redundancy coding in respective second and first dimensions, the two-dimensional data frame comprising a plurality of rows, each row comprising a first codeword and a plurality of columns, each column comprising a second codeword; partitioning the two-dimensional data frame into a plurality of logical track blocks (1106) each comprising a plurality of first codewords; and recording (1110) each logical track block to a corresponding respective physical track on the magnetic tape data storage medium. Redundancy coding of a data frame is distributed across a plurality of other data frames along the tape, and redundancy bytes of each data frame are distributed across a plurality of data tracks. Redundancy coding may be distributed diagonally across a width of the tape. Data obliterated due to damage to individual physical recorded tracks or sections of tracks on the tape may be recovered from redundant coding data distributed across other adjacent parallel physical tracks on the tape.

14 Claims, 13 Drawing Sheets

|  | Physical Track Number (Band, Track) | Physical Group Number |
|---|---|---|
| Data Track Band 201 | 1,0<br>1,1<br>1,2<br>1,3<br>1,4<br>1,5<br>1,6<br>1,7 | 0<br>0<br>0<br>0<br>0<br>0<br>0<br>0 |
| Data Track Band 202 | 2,0<br>2,1<br>2,2<br>2,3<br>2,4<br>2,5<br>2,6<br>2,7 | 0<br>0<br>0<br>0<br>0<br>0<br>0<br>0 |
| Data Track Band 203 | 3,0<br>3,1<br>3,2<br>3,3<br>3,4<br>3,5<br>3,6<br>3,7 | 0<br>0<br>0<br>0<br>0<br>0<br>0<br>0 |
| Data Track Band 204 | 4,0<br>4,1<br>4,2<br>4,3<br>4,4<br>4,5<br>4,6<br>4,7 | 0<br>0<br>0<br>0<br>0<br>0<br>0<br>0 |

1st Transverse Direction ↓    2nd Transverse Direction ↑

Fig. 2

| row No. \ Col No. | 0 | 1 | 2 | ... | 183 | 184 | 185 | 186 | ... | 191 |
|---|---|---|---|---|---|---|---|---|---|---|
| 0 | | | | User Data Set | | | | | | |
| 1 | | | | | | | | | | |
| ... | | | | | | | | | | |
| 1790 | 343874 | 347875 | 343876 | | 344055 | 344056 | 344057 | 344058 | | 344063 |
| 1791 | 344064 | 344065 | 344066 | | | | | | | |
| 1792 | | | | C2 Parity Information | | | | | | |
| ... | | | | | | | | | | |
| 2047 | 393024 | 393025 | 393026 | | 393207 | 393208 | 393209 | 393210 | | 393215 |

Fig. 4

| Col. No. | 0 | 1 | 2 | | 186 | 191 | |
|---|---|---|---|---|---|---|---|
| row No. | | | | | | 191 | ⎫ Track Block 0 |
| 0 | | | | | | | |
| 1 | 5952 | 5953 | 5954 | | | 6143 | |
| ... 31 | 6144 | 6145 | 6146 | | 6138 | 6335 | ⎫ Track Block 1 |
| 32 ... | 12096 | 12097 | 12098 | | 12282 | 12287 | |
| | | | | C1 Parity | | |
| 2015 | | | | | 393310 | 393215 | ⎫ Track Block 63 |
| 2047 | 393024 | 393025 | 393026 | | | | |

Fig. 7

SCRATCH PROTECTION IN TAPE DATA STORAGE SYSTEM

FIELD OF THE INVENTION

The present invention relates to a method of redundancy coding for scratch protection in a linear tape data storage device and medium.

BACKGROUND TO THE INVENTION

In order to store digital electronic data it is known to use magnetic tape cartridges comprising a pair of reels, which are inserted into a tape drive unit having a plurality of read/write heads. Typically, such magnetic tape storage devices may be used to back up data generated by a host device, eg a computer, or to store data generated by test or measurement instruments. For example, the conventional SureDrive® data storage unit manufactured by Hewlett Packard Company is capable of storing 8 GBytes of data on a single cassette cartridge. In the conventional SureDrive series 12000 unit, by including a plurality of cassette cartridges, a data storage capacity 48 Gbytes is achieved in a single compact drive assembly of dimensions of the order of a few tens of centimeters.

Conventional tape drive units operate to draw an elongate magnetic tape past a read/write head. Tape speeds past the heads are relatively slow, of the order of a few centimeters per second.

In the conventional tape drive, electronic circuitry is provided to encrypt the digital data to be stored, using an algorithm which applies redundancy encryption to the original digital data, so that the data recorded on to the magnetic tape incorporates redundant data from which the original data can be recovered if there is corruption of the data recorded on the tape. Such corruption may occur at the edges of the tape due to non-uniform coating of the tape with magnetic material, or due to variations in alignment of the tape with the read/write head.

An on-going objective of magnetic tape drive development is to increase the amount of data which can be stored on a magnetic tape, and to reduce the size of tapes and tape drives thereby allowing drives to be used in an increasing range of applications. Achieving such objectives involves increasing the density of recorded data per unit area of tape.

However, as data density is increased and tape sizes become smaller, loss of data due to tape damage caused by tape stretching, or scratching of the tape becomes more problematic as any such damage may obliterate larger amounts of data.

It is another ongoing objective of tape drive development to increase the reliability of tapes and tape drives whilst reducing their cost.

SUMMARY OF THE INVENTION

Specific embodiments and methods according to the present invention aim to maintain integrity of data under conditions of scratched or damaged tape surface in high data storage density tape systems, and thereby improve reliability of such devices.

According to one aspect of the present invention there is provided a method of redundancy coding data comprising the steps:

forming a plurality of data frames by arranging a byte stream of data into a plurality of data sets, and for each data set, applying a redundancy coding to said data set to obtain a corresponding data frame; and for each said data frame, distributing said redundancy coding of said data frame over all other said data frames of the plurality of data frames.

Preferably, said step of applying a redundancy coding comprises:

arranging a said data set into a 2 dimensional array;

applying a first coding algorithm to said data set in a first dimension to obtain a plurality of first codewords; and applying a second coding algorithm to said data set in a second dimension to obtain a plurality of second codewords.

Preferably, said step of distributing redundancy coding comprises for each said data frame, distributing bytes of each second codeword of said data frame over said plurality of data frames.

Preferably, said step of distributing said redundancy coding comprises partitioning each said data frame into a plurality of track blocks, each track block comprising a plurality of said first codewords read sequentially as rows of said data frames, and for each second codeword of a said data frame, distributing bytes of said second codeword across a plurality of said track blocks of said plurality of data frames.

According to a second aspect of the present invention, there is provided a method of storing data on a magnetic tape data storage medium, said method comprising the steps of:

partitioning said data into a plurality of data sets;

applying a redundancy coding to each said data set to produce a plurality of corresponding data frames; and recording each said data frame of the plurality of data frames onto a length of tape, wherein a redundancy coding of each said data frame is distributed over said plurality of recorded data frames.

Preferably, for each said data set, a said redundancy coding comprises a plurality of first codewords, and a plurality of second codewords, and said distribution of redundancy coding may comprise bytes of said second codewords arranged diagonally across a length of said tape.

A plurality of physical data tracks on a length of magnetic tape data storage medium are substantially parallel to each other, and extend along a main length of said magnetic tape. Said data frame suitably comprises a plurality of first codewords in a first dimension and a plurality of second codewords in a second dimension. Said first codewords are suitably distributed along a length of the tape in a direction parallel to a direction of travel of the tape, whereas the second codewords may be distributed on the tape in a direction transverse to a direction of travel of the tape.

By redundancy coding a data frame in two dimensions, and distributing a data frame across different physical tracks of the tape, redundancy data corresponding to user data recorded on a first physical track is distributed across a plurality of other physical tracks. Loss of data from a first physical track due to tape damage, for example elongate scratches along the track may be recoverable from redundancy coded data contained in adjacent, undamaged tracks.

The two dimensional data frame comprises a plurality of data rows and data columns. Recording the data frame may comprise recording a said row within a single corresponding said data track and recording a said column across a plurality of said data tracks. Recording may comprise recording all bytes of a said row in a single track along a main length of said tape and recording bytes of a said column distributed in a direction across a width of said tape and in a direction along a main length of said tape.

Suitably, physical tracks over which a two-dimensional data frame are distributed, are sufficiently far apart that adjacent tracks containing data of a same data frame will not be obliterated by a same elongate scratch.

Preferably said data frame comprises a plurality of first codewords in a first dimension, and said method may comprise the step of partitioning said two dimensional array into a plurality of track blocks, each track block comprising a plurality of said rows and said step of recording may comprise recording each said track block to a corresponding said physical track.

The arrangement is suitably such that each said second codeword has at most one byte in common with each track block. A first codeword may operate to locate a position of an error in said two dimensional data frame, and the second codeword may operate to correct an error itself.

Suitably, a plurality of bytes of a second codeword are distributed substantially uniformly over an area of tape occupied by a plurality of recorded data frames. By distributing bytes of a second codeword substantially diagonally across a length of the tape and by spreading out the bytes substantially uniformly over a length occupied by an area of the tape corresponding to the plurality of the recorded data frames, improved protection against longitudinal scratches in a direction parallel to a length of the tape, and transverse scratches in a direction normal to a length of the tape may be obtained.

According to a third aspect of the present invention, there is provided a method of storing data on a magnetic tape data storage medium, said method comprising the steps of:

partitioning said data into a data set;

performing a data frame by applying a first redundancy coding to said data set and applying a second redundancy coding to said second data set; recording said first redundancy coding of said data frame over a first region of tape; and recording said second redundancy coding of said data frame over a second region of tape, wherein said second region of tape containing said second redundancy coding extends outside said first region of tape containing said first redundancy coding.

Preferably, said first region has a first length along said tape, and said second region has a second length along said tape, said second length being greater than said first length.

Said second region may be occupied by other said data sets of a plurality of data sets.

The invention includes an encoding apparatus for encoding a byte stream of data, said encoding apparatus comprising:

means for arranging said byte stream into a two dimensional data array;

means for encoding said two dimensional data array with a first coding in a first said dimension; and means for encoding said two dimensional data array with a second coding in a second dimension, wherein symbols of said second coding are encoded within a byte stream of a plurality of further said encoded two dimensional data arrays.

Suitably, the encoding apparatus comprises an application specific integrated circuit.

A byte stream of user data from a host apparatus is buffered and is compiled into a sequence of data sets. Each data set is formed into a two-dimensional data array which is redundancy coded in first and second dimensions to form a data frame.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 2 illustrates a layout of a band group comprising a plurality of physical data tracks recorded onto a magnetic tape data storage medium according to a specific method of the present invention;

FIG. 4 illustrates a two-dimensional data frame assembled using first and second redundancy codings according to a specific method of the present invention;

FIG. 7 illustrates in further detail a data frame partitioned into a plurality of logical track blocks;

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without using these specific details. In other instances, well known methods and structures have not been described in detail so as not to unnecessarily obscure the present invention.

Specific methods according to the present invention as described herein are aimed at magnetic tape recording devices having a substantially static read/write head in which an elongate tape wound between first and second reels is drawn past the head at relatively high speed, for example of the order of 3 meters per second. Reading and writing of data onto the tape may be carried out in both forward and reverse pass directions of the tape relative to the head, and a plurality of parallel data tracks may be read or recorded onto the tape simultaneously, using a read/write head comprising a plurality of spaced apart read/write elements.

Figure 1:
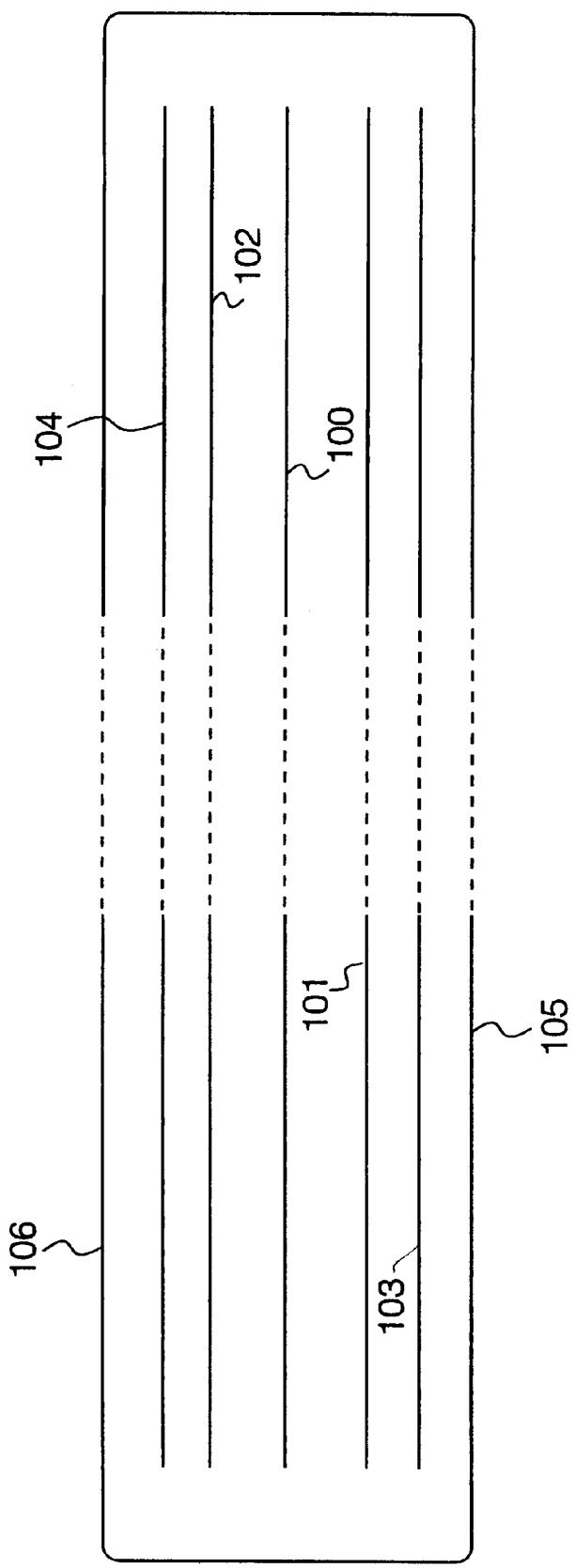
FIG. 1 illustrates a plurality of paths taken by a read/write head relative to an elongate band of magnetic tape material according to a specific method of the present invention.

Referring to FIG. 1 herein, there is illustrated schematically a physical layout of data recorded along an elongate band of magnetic tape by a read/write head of a magnetic data recording device as the tape is drawn past the head according to a specific method of the present invention. The read/write head contains a plurality of read elements and a plurality of write elements arranged to read or write a plurality of physical tracks of data along the tape simultaneously, resulting in physical tracks 100–104 which are recorded parallel to each other along a length of the tape. The plurality of read/write elements are spaced apart from each other in a direction transverse to a direction of movement of the tape, typically by a distance of the order 200 μm. Each read/write element is capable of reading or writing a physical track of width of the order 20 μm or so.

The read/write head records a plurality of band groups along the tape in a path as shown in FIG. 1 herein. Each band group contains a plurality of bands, each band comprising a plurality of physically recorded data tracks. Substantially a complete length of the tape is wound past the static read/write head in a single pass.

Referring to FIG. 2 herein, there is shown schematically a layout of a single band group (initial band group 0) along the tape. Each band group comprises a plurality of number N datatrack bands 201–204 onto which are recorded data. In the case of FIG. 2, there are 4 data track bands per band group. Each data track band comprises a plurality M of individual data tracks, each track recording a channel of digital data. In the case of FIG. 2, there are shown 8 tracks per datatrack band, and 32 data tracks per band group. The tape wound between the first and second reels moves across the static read and write elements reading and/or recording one track per datatrack band of a band group in a single pass. Thus, using the example of a four datatrack band group, one track of each of four bands (ie first track 0) may be recorded at the same time. The read/write head is moved across the tape a short distance, of the order 20 μm in a first transverse direction, transverse to the main length of the tape, to align with the second track (track 1) of each datatrack band, and reading/writing of the second track of each band occurs in parallel in a second pass.

Subsequently, the read/write head is further moved across the tape in the same transverse direction, a further 20 μm and a third track of each datatrack band (track 2) is recorded, and so on, until all eight tracks of each band are recorded, at which point the band group is fully recorded.

Data is arranged into logical tracks, which are then recorded onto the tape as physical tracks as shown in FIG. 2. Using an example, of writing initial band group 0 comprising bands 200–204 (band numbers 0–4) in FIG. 2, data is written during a pass of the tape along the band group. In a head arrangement of four read/write elements, four physical tracks (1,0; 2,0; 3,0; 4,0) are recorded and/or read simultaneously in parallel from the first end of the tape to the second end of the tape.

Whilst the above scheme for linear reading and writing of data along a length of the tape may provide advantages in achievable data density in terms of data per unit area of tape, and reduced wear on tape and drive components compared to conventional recording techniques, the small dimensions of the tracks and the relatively high tape speed used may lead to damage and defects occurring on the tracks. Although damage to the tape surface can occur in any direction with respect to the main length of the track, particular types of defect are common.

Firstly, scratches may occur along the length of the tape due to stationary particles of dust or dirt becoming trapped in the cartridge or tape drive mechanism and abrading the surface of the tape as the tape is wound.

Secondly, particles of dirt may become lodged between the read/write heads and the tape, leading to inefficient or non-existent reading and writing of data along portions of the length of the tape.

Thirdly, data may be obliterated in a direction across the width of the tape due to folding or creasing of the tape, and stressing or stretching of the tape around rollers or the like.

In conventional prior art tape drive mechanisms, general damage to the tape is a known problem and solutions to the problem have been employed which involve redundancy coding of data to be stored prior to recording the data on tape.

Figure 3:
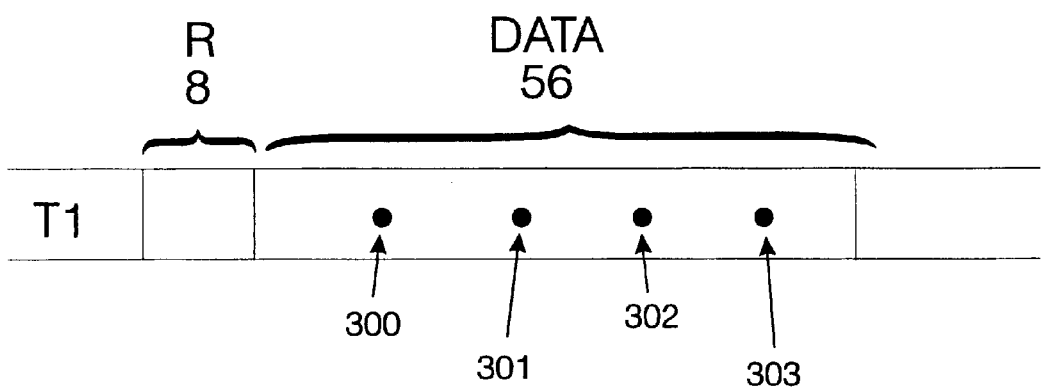
FIG. 3 illustrates a prior art redundancy coding scheme for redundancy coding a 64 byte codeword.

Referring to FIG. 3 herein, there is illustrated operation of a prior art error correction scheme in which a code word of 64 bytes comprises 56 bytes of user data, and 8 bytes of encrypted redundancy data. The bytes of data are illustrated schematically in FIG. 3 as recorded onto a tape along a single track produced as a tape is drawn past a write head. Individual bytes of user data may be obliterated by scratches or defects 300–303 on the tape. Using the prior art eight byte redundancy scheme, provided the locations of the corrupted user data are known within the code word, up to eight bytes of corrupted data per code word can be corrected. However, if the positions of the corrupted bytes within the code word are not known, using 8 bytes of redundancy data, four of those bytes are used to find the defects, leaving four remaining redundancy bytes from which to correct the corrupted data, so that where the positions of the corrupted data are unknown in a 64 byte code word, a maximum of 4 bytes can be corrected using the conventional redundancy scheme. With the conventional error correction technique, half of the power of the technique is used to detect where the errors are, and the other half of the power is used to correct the errors There are not enough bytes of redundancy data to locate and rectify more than four defect bytes per 64 byte codeword. The conventional redundancy scheme does not provide for correction of defects which obliterate whole code words along a track recorded linearly along a length of tape.

Using the prior art error correction scheme, if a defect on the physical track, for example an elongate scratch along the length of the track, obliterates more than a few bytes per recorded codeword, the prior art error correction scheme is unable to recover the obliterated data. Prior art systems either leave long scratches uncorrected, resulting in loss of data or apply two further levels of error protection. Each further level of error protection requires its own dedicated set of hardware for its implementation, and therefore adds to the cost and complexity of known tape data storage devices.

However, in the best mode of the present invention described herein, it has been found that in a multi-channel data recording device which records data to a plurality of physical data tracks on a magnetic tape data storage medium in parallel, it is possible to devise a Reed-Solomon product code such that, when interleaved across a plurality of physical tracks, data may be recovered even when one or more of those tracks are damaged so that data on that track is unrecoverable Assuming a number of channels C, and a outer level code C2 having a redundancy of R, then such a correction scheme becomes possible when 1/C is less than or equivalent to R.

For example, when C2 is a (32, 24, 9) code with 25% of redundancy and data is recorded through 4 active channels on to 4 respective tracks, data may be interleaved such that any single track on which data is computed may be recovered by successive invocations of C2 codewords. When a larger number of active channels are recorded, a same principle may be applied. For example with 32 active channels, using the same C2 code, 8 of the 32 channels may be concurrently recovered.

A redundancy coding scheme is presented herein according to a specific implementation of the present invention. In this specification, the following terms have meanings described as follows:

a "data set" is a unit of a pre-determined number of bytes of data to be recorded;

a "data frame" comprises a data set to which has been added first coding (C1 coding) bytes and second coding (C2 coding) bytes;

a "logical track block" is a unit of data comprising a data set, which is to be recorded on a single physical data track of a tape. A data set may comprise a plurality of logical track blocks;

a "physical track block" is a unit of data comprising a data set which is recorded onto a physical track of tape. A logical track block becomes a physical track block once it is recorded onto tape;

a "track block set" is a group of track blocks which are written on to tape at the same time as each other;

a "codeword" is a word of data which is generated by a processing algorithm. The number of bits in a codeword may vary.

In the specific implementation of the present invention presented herein, redundancy bytes of one data frame are distributed over a plurality of track blocks. When recorded on tape, damage to data of one track block may be corrected from data of other track blocks recorded further along the tape, or further across the tape, enabling either an increased length of scratch correction to be achieved for a given redundancy coding overhead, or alternatively allowing a reduced redundancy coding overhead to be used to correct a scratch.

A specific implementation according to the present invention will now be described. In the specific implementation presented herein, redundancy coding relating to a first physical track block is distributed over a plurality of other physical track blocks recorded onto tape. A data set is formed into a two dimensional array in a buffer device and to the data set is applied a first redundancy coding in a first dimension and a second redundancy coding in a second dimension resulting in a data frame comprising a plurality of first codewords along the first dimension and a plurality of second codewords along the second dimension. The data frame is divided into a plurality of logical track blocks each comprising a predetermined number (eg 32) of first codewords. Each logical track block is then recorded onto a physical data track of the tape as a physical track block. A plurality of physical track blocks are recorded onto each of a plurality of physical data tracks, so that for any data frame there are recorded more than one physical track block on each physical data track. Each second codeword is distributed over the plurality of physical data tracks and over the plurality of physical track blocks, one byte of each second codeword being present in each physical track block. In order to correct a large error, data from all of the physical track blocks needs to be reconstructed.

Referring to FIG. 4 herein, there is illustrated conceptually a redundancy coded two dimensional data frame according to a specific method and structure of the present invention. A host device supplies a byte stream of incoming user data to be stored which is partitioned into a plurality of data sets. Each data set is processed into a two dimensional array and is input into first and second processors which process the array into a plurality of first codewords (designated C1 type 1 codewords herein) and a plurality of second codewords (designated C2 type 2 codewords herein). The plurality of type 1 first codewords and type 2 second codewords comprise a data frame as shown in FIG. 4. The first codewords comprise rows of the data frame and the second codewords comprise columns of the data frame. The data frame comprises 2048 first code words each of length 192 bytes, giving a total data frame capacity of 393,216 bytes. Of this, the user data to be stored comprises 1792 strings of data each of length 186 bytes, giving a data set of 333,312 bytes in total. The remaining bytes in the frame comprise first redundancy coding data and second redundancy coding data (referred herein as C1 and C2 parity information) respectively.

Figure 5:
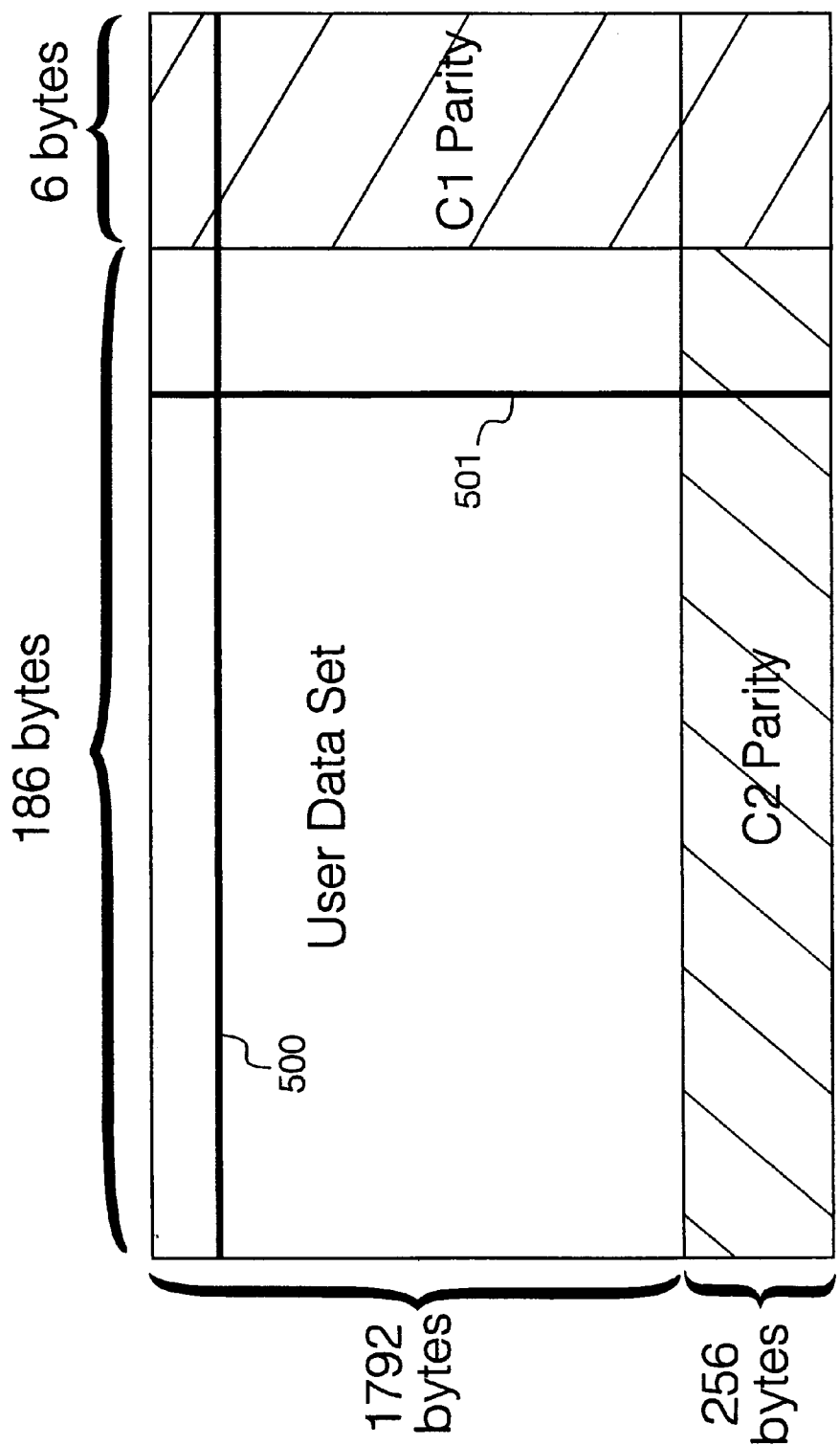
FIG. 5 illustrates the two-dimensional data frame of FIG. 4 illustrating first and second codeword types comprising the two-dimensional data frame.

Referring to FIG. 5 herein, there is illustrated within the two dimensional data frame, an example of a first codeword 500 and an example of a column 501 of second codewords. Each column comprises 32 second codewords each of 64 bytes length interleaved within the column. A maximum codeword length allowed by the Reed Solomon coding is 255 bytes. The first and second codeword types are orthogonal to each other. That is to say, where the data frame is represented schematically as a two dimensional array of bytes of data, a first codeword of length 192 bytes comprising a row of the data frame is read in a direction corresponding to a first dimension, and a second codeword of length 64 bytes comprising a column of the first data frame is read in a direction corresponding to a second dimension. Since the plurality of first codewords are orthogonal to the plurality of second codewords, each first codeword 500 shares a single byte of data in common with each second codeword 501. Each second codeword comprises one byte of each of a plurality of first codewords, and each first codeword comprises one byte of a plurality of the second codewords.

The two dimensional data frame comprises a data set of 333312 bytes which are arranged into 1792 data strings, each of length 186 bytes; a set of 47616 bytes of second redundancy coding C2 parity data comprising 256 C2 parity data strings each of 186 bytes length; and a set of first redundancy coding C1 parity data of 12288 bytes comprising 2048 data strings of first redundancy coding C1 parity data each string of length 6 bytes. A first codeword type comprises a string of user data (186 bytes) plus a string of C1 parity data (6 bytes), or a string of C2 parity data (186 bytes) plus a string of C1 parity data (6 bytes). A column of 32 second codewords comprises a column of user data (1792 bytes) plus a column of C2 parity data (256 bytes), or a column of C1 parity data (2048 bytes).

Figure 6:
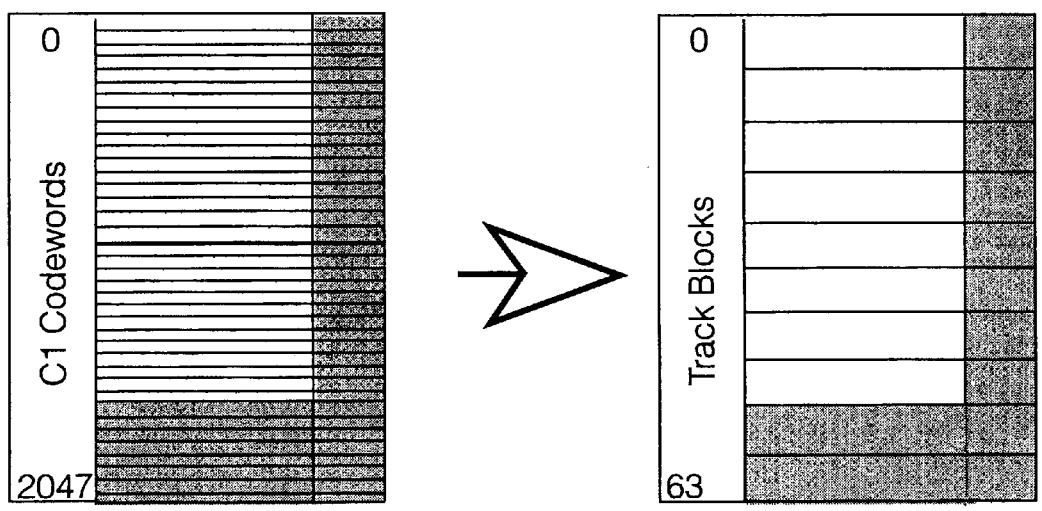
FIG. 6 illustrates a partitioning of a data frame into a plurality of logical track blocks.

Referring to FIG. 6 herein, there is illustrated schematically how a data frame comprising 2048 first codewords is partitioned into 64 logical track blocks, each comprising 32 first codewords. Referring to FIG. 7 herein, there is illustrated in further detail partitioning of a data frame into a plurality of logical track blocks as described in FIG. 6. The data frame comprising a user data set of 186×1792=333312 bytes, plus 59904 bytes of C1 and C2 redundancy data is divided into 64 track blocks, each comprising 32 first codewords of 192 bytes each. Each track block is read sequentially onto a tape track from its first row to its thirty second row to produce a corresponding physical track block recorded on tape. For example rows 0 to 31 are read sequentially for track block 0 as illustrated in FIG. 6, such that track block zero comprises codewords comprising rows 0, 1, 2, . . . 31 of the data frame read in that sequence.

Figure 8:
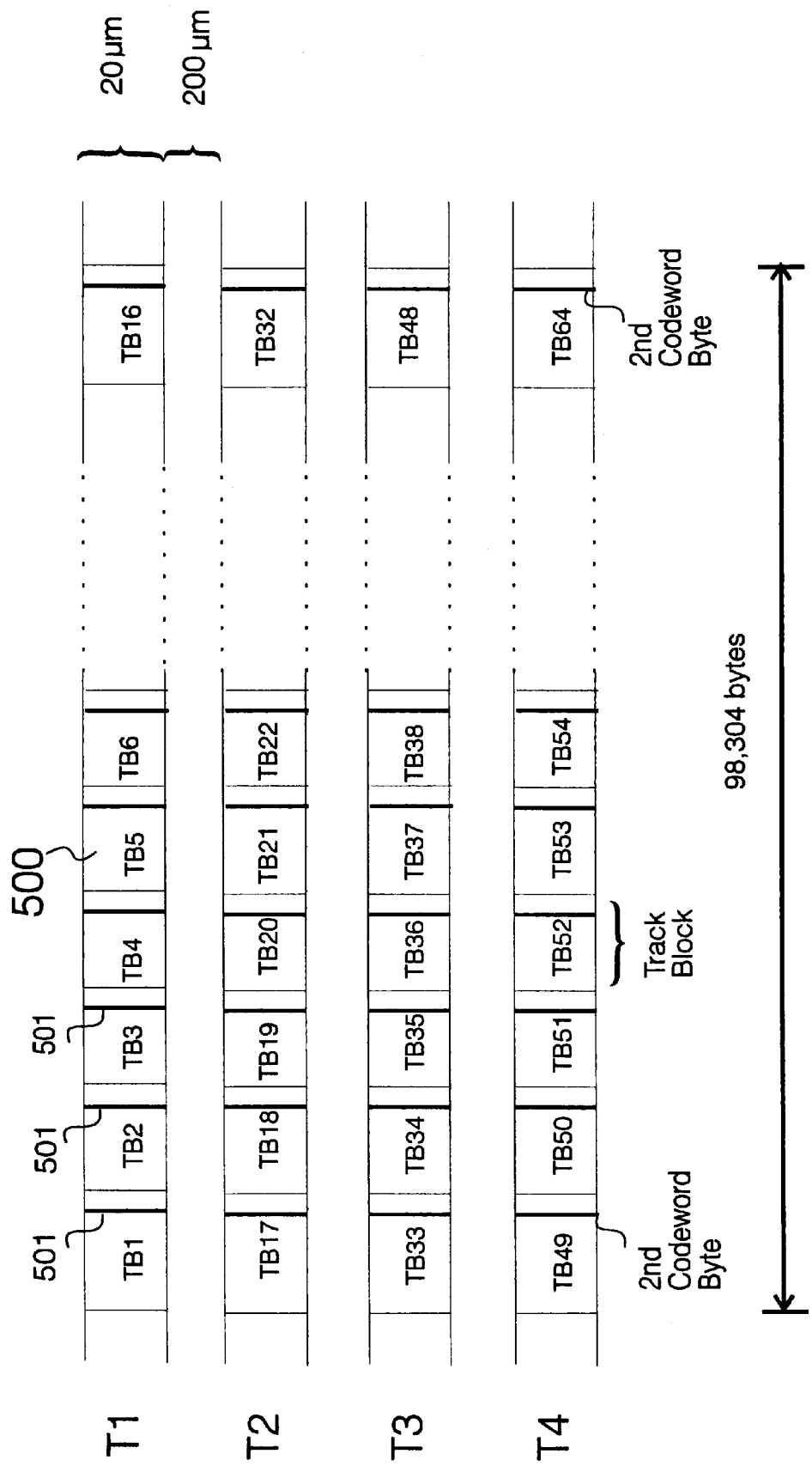
FIG. 8 illustrates schematically an arrangement of a plurality of logical track blocks recorded as physical track blocks along a plurality of physical data tracks of magnetic tape data storage medium, and illustrating a distribution of a second codeword within the layout of physical track blocks.

Referring to FIG. 8 herein, there is illustrated a physical track block layout of the data frame of FIGS. 4 to 6 recorded onto four parallel tracks T1–T4 along a length of the tape by four write elements operated simultaneously. Each physical track is of width around 20 $\mu$m typically, the tracks being separated from each other by a distance of around 200 $\mu$m. The data frame, when physically recorded onto the tape, has a length of 16 logical track blocks, there being recorded 16 logical track blocks sequentially on each of the four physical data tracks. The physical length of the data frame along the tape extends a distance of 98,304 bytes, each logical track block extending 6144 bytes in length.

The logical track blocks are recorded in track block sets across the width of the tape and along a length of the tape in the case of FIG. 8, track blocks of a first track block set being written simultaneously by four individual write elements, a first track block TB1 being recorded on the first physical track T1, a second track block TB17 being recorded on a second physical track T2, a third track block TB33 being recorded on a third physical track, a fourth track block TB49 being recorded on a fourth physical track T4. A second track block set is then recorded comprising a fifth track block TB2 being recorded again on the first physical track T1, a sixth track block TB18 being recorded on the second physical track T2, etc., as shown in FIG. 8 until the whole of the data frame has been recorded in 2 dimensions on the plurality of physical tracks of the magnetic tape data storage medium.

Each second codeword of the data frame is distributed across all four tracks and across a whole length of the physically recorded data frame. For each logical track block of 6144 bytes, the second codewords of that track block are distributed across all other track blocks of the plurality of track blocks in the data frame. The individual bytes of each of the second codewords of a logical track block are physically separated from each other by 6144 bytes (a logical track block) as they are distributed over the plurality of physical tracks along the length of the tape, and across a width of the tape, as shown in FIG. 8 herein. For each second codeword, a byte of that codeword appears at a same position relative to a start of the track block, for successive track blocks. Bytes of only one second codeword are shown in FIG. 8. Bytes of other second codewords of the data frame are distributed similarly.

Since there are only 64 physical track blocks per data frame, and a second codeword comprises 64 bytes, a column of second codewords of a first data frame comprising 2048 bytes in all continues to be recorded in track blocks of successive second to thirty second data frames along the length of the tape. Thus, a column of the first data frame is not restricted to being recorded within a single track block set of that data frame, but extends over the thirty one subsequent recorded track block sets (a total of 2048 track blocks in all). Thus, whilst the first codewords of a data frame are contained within the physical track blocks of that data frame, bytes of the second codewords of the data frame are distributed across a plurality of physical track blocks of a plurality of data frames. The first redundancy coding (C1) having 6 bytes per 186 bytes has around 3% redundancy, and is used to correct small errors which are correctable with this level of redundancy, and more importantly, to identify locations of larger errors. The second redundancy coding (C2) is used to correct the larger errors. A single second codeword may be distributed over a physical length of tape extending over four data tracks across the width of a tape, and extending over a length of around 350 mm. Where a 25% C2 redundancy coding is used, this gives a maximum length of scratch protection of the order of around 80–90 mm where all four tracks are affected by a scratch. Where a scratch happens to occur obliterating an end of one data set and continuing onto a beginning of a second data set, a maximum scratch length of around 170 mm may be corrected using such a scheme. In order to correct a scratch of such length, it will be necessary to reconstitute the data frames of each data set in which the scratch occurs. Where a scratch affects one track only, then using a 25% coding for four physical tracks then a scratch length extending over a whole length of the tape may be corrected.

Figure 9:
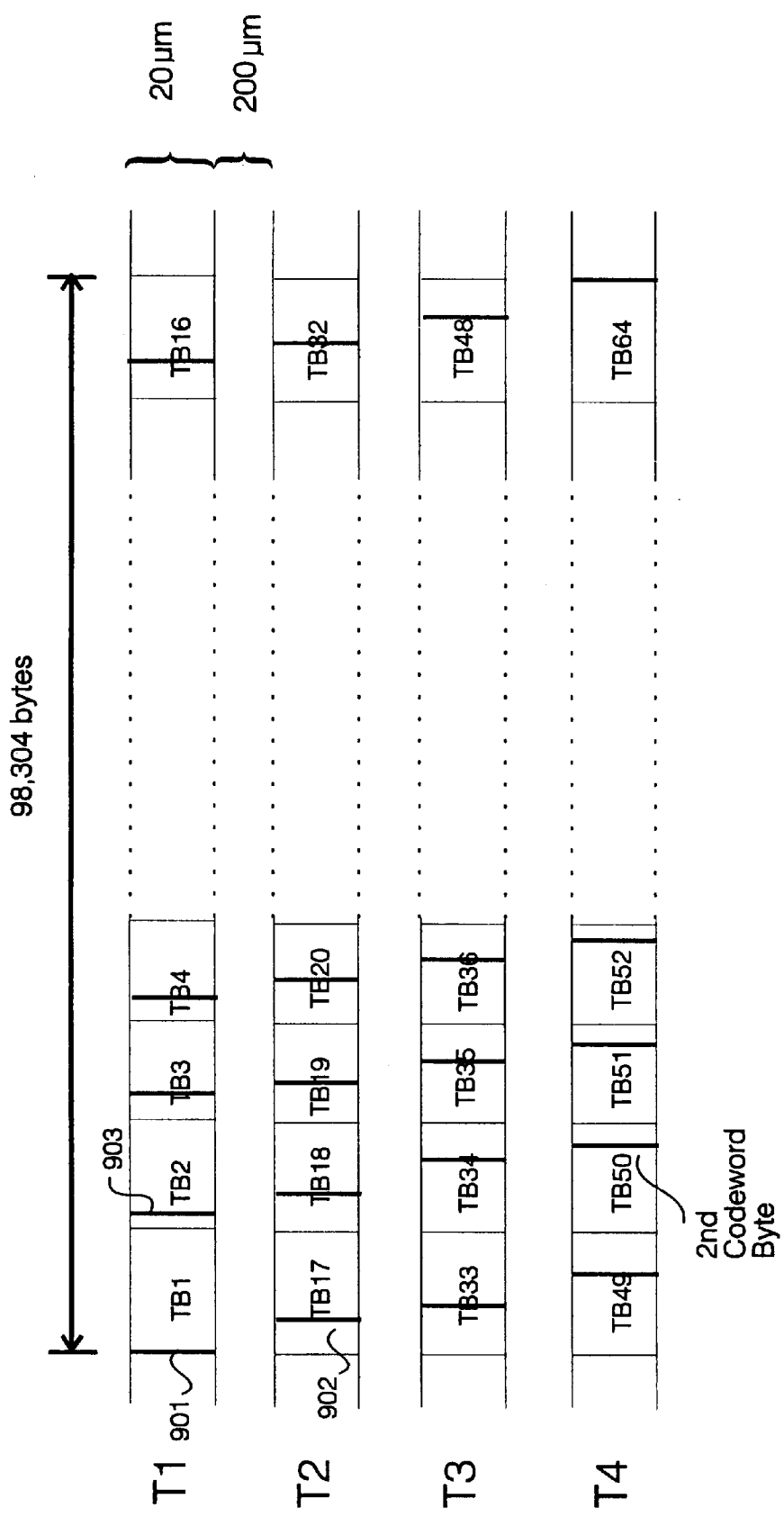
FIG. 9 illustrates a variation of a layout of bytes of a second codeword within a physical track blocks on a plurality of physical data tracks of a magnetic tape.

Referring to FIG. 9 herein, there is shown a variation of distribution of bytes of a recorded second codeword within a plurality of track blocks of a data frame, wherein positions of bytes of a specific second codeword within the same track block set, eg track block set TB1, TB17, TB33, TB49, are spaced apart from each other lengthwise along the tape, as much as possible. This configuration may give improved protection against defects which extend across a width of the tape. Instead of a byte of a second codeword appearing at a fixed position within each successive physical track block, the position of successive bytes of a second codeword is varied within the track blocks from track block to track block, when recorded along physical data tracks T1–T4. In a first physical track block TB1, a first byte of a second codeword is positioned at a first byte position. In a second track block TB17 on parallel physical data track T2, a second byte of the second codeword is placed at a second byte position. Similarly, on a third track block TB33 recorded simultaneously with first and second track blocks TB1, TB17, a third byte of the second codeword is recorded at a third byte position. A fourth physical track block TB49 recorded on fourth data track T4 is recorded at a fourth byte position within that track block. A separation of four bytes of a second codeword within a single track block set, eg TB1, TB17, TB33, TB49 in a lengthwise direction along a length of the tape is of the order 1536 bytes, ie that is to say byte 902 is 1536 bytes along the tape further the byte 901 of the same second codeword in the same track block set TB1, TB17, TB33, TB49. Successive bytes of a same second codeword are incremented in their position within successive track block sets by 192 bytes length along the tape, that is to say, byte 903 is incremented to a relative position within successive track block T2 of first track T1 by 197 bytes compared to a position of byte 901 of preceding track block TB1 of the same track T1. On recording the fifth to eighth physical track blocks TB2, TB18, TB34, TB50 in the next track block set, the fifth to eighth bytes of the second codeword are recorded at respective byte positions five to eight of those physical track blocks. Similarly, successive bytes of the second codeword are recorded across all track blocks until all the second codewords of the data frame have been recorded onto tape, there being one byte of a second codeword per track block, the bytes distributed across all track blocks of a plurality of data frames and distributed lengthwise and widthwise across the physical tracks of the tape. Thus, as shown in FIG. 9 bytes of a second codeword may be distributed substantially uniformly over an area of tape occupied by a plurality of data frames.

Figure 10:
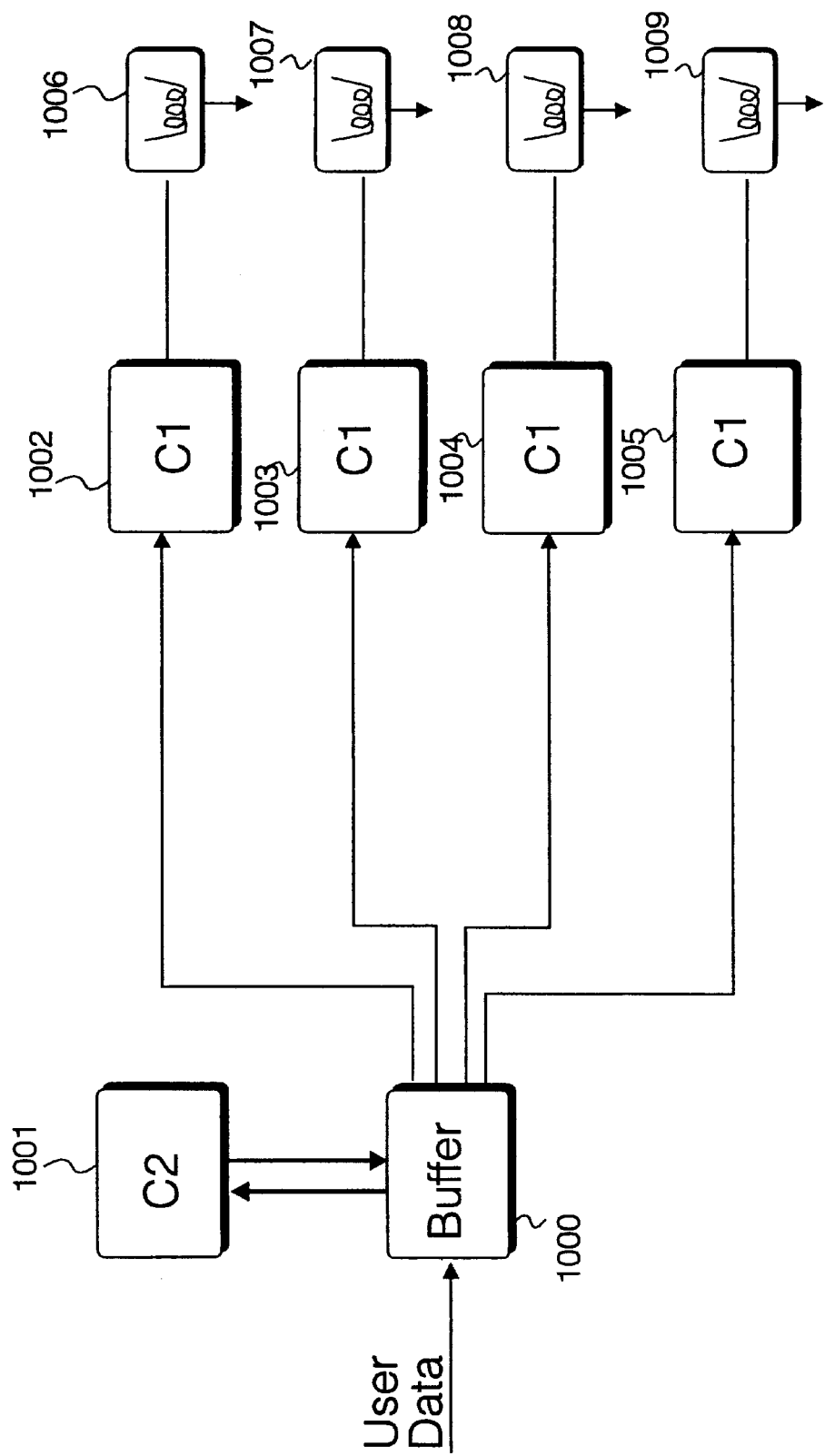
FIG. 10 illustrates schematically a data encoding apparatus for redundancy coding a byte stream of user data received from a host apparatus prior to recording the user data onto a magnetic tape storage medium according to the specific implementation of the present invention.

Referring to FIG. 10 herein, there is illustrated an encoding apparatus for encoding user data prior to recording the user data onto a plurality of physical data tracks as described hereinbefore. The apparatus comprises an input buffer 1000 for storing a plurality of data frames; a C2 redundancy coding processor 1001 for applying a second (C2) redundancy coding algorithm to a plurality of data sets; first to fourth C1 encoding processors 1002–1005 for applying a first C1 redundancy coding algorithm to the C2 encoded data sets, and first to fourth read/write elements 1006–1009 for recording the C1 and C2 encoded data frames onto four separate physical tracks along a length of magnetic tape storage medium. Typically, the encoding apparatus comprises an application specific integrated circuit (ASIC) configured as redundancy coding processors operating C2 and C1 redundancy encoding algorithms respectively. The buffer 1000 may comprise a separate random access memory having a capacity capable of storing a plurality of data frames, and the buffer may communicate with the C1, C2 coding processor at a data rate of the order 80 MHz.

Figure 11:
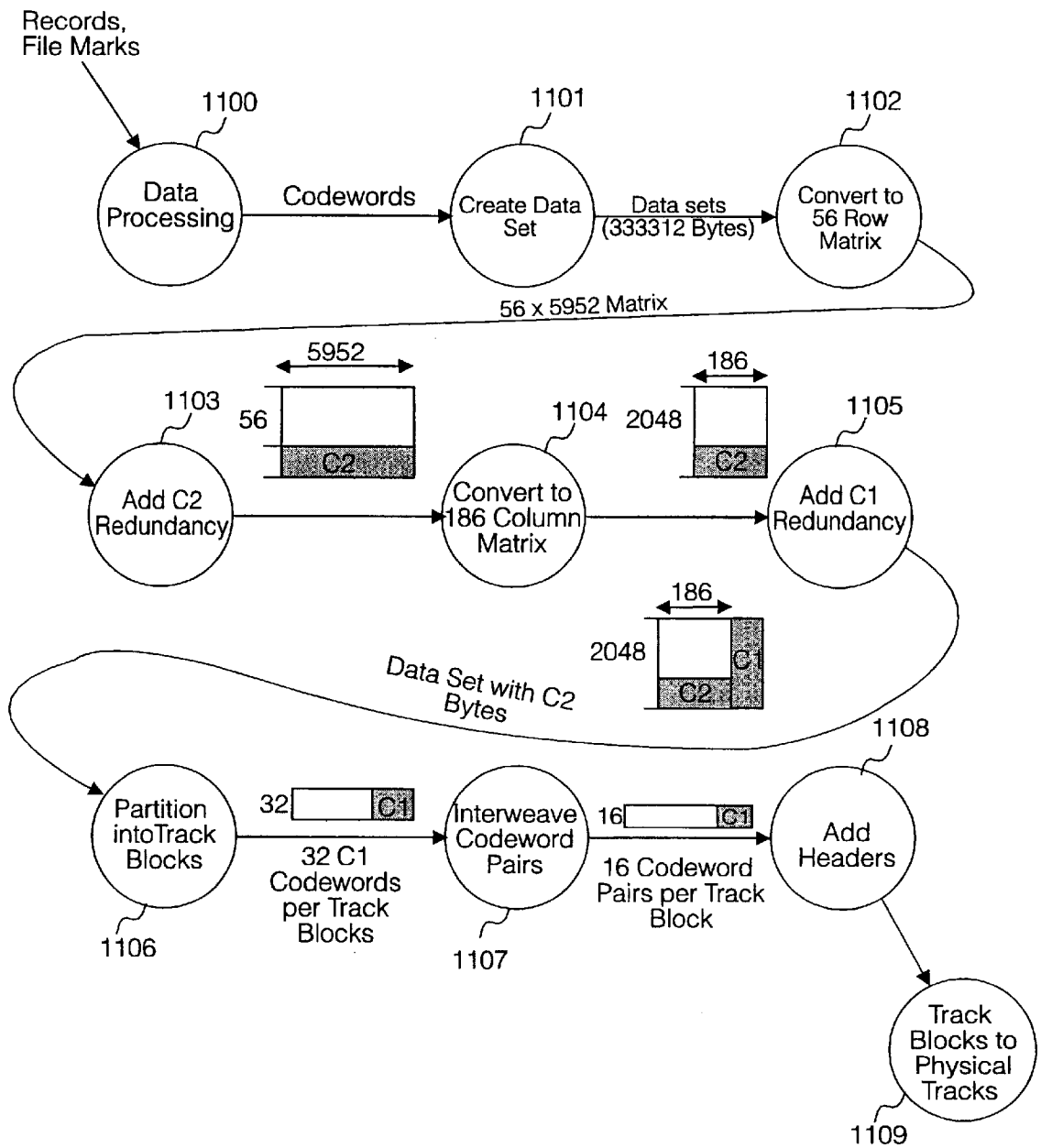
FIG. 11 illustrates in general overview a process for redundancy coding and recording a byte stream of data from a host apparatus onto a magnetic tape data storage medium according to a specific implementation of a present invention.

Referring to FIG. 11 herein, there is illustrated schematically an overall process operated by the apparatus for FIG. 10 in order to record C1 and C2 encoded user data in a series of track blocks onto a magnetic tape data storage device as hereinbefore described. Operation of the apparatus of FIG. 10 in accordance with the method of FIG. 11 will now be described, in relation to a second specific method of the present invention using a 12.5% C2 redundancy coding, in which a two-dimensional data frame as shown in FIGS. 4 to 7 herein is recorded, having user data set of 333312 bytes, a C2 redundancy coding of 47616 bytes and a C1 redundancy coding of 12288 bytes.

In step 1100, a byte stream of user data is input into input buffer 1000. The user data is partitioned into a set of records, each having a four byte cyclical redundancy code, for protecting the record. The cyclical redundancy code may be checked when data is recovered during a read operation of the user data. During a read operation, inspection of the cyclical redundancy code is used to verify that the user data in the record has not been corrupted during storage on the tape. In step 1100, data processing of the user data comprises generating a stream of user data words based on the sequence of protected records and file marks issued by the host apparatus which originates the data. The purpose of the data processing step 1100 is to remove redundancy from the incoming user data stream. In step 1101 a user data set of fixed length is created by grouping a predetermined number of the processed user data words resulting from step 1100. Data sets are created having a fixed length of 333,312 bytes. In step 1102, each user data set is converted into a two dimensional matrix having 56 rows and 5952 columns. In step 1103, a second (C2) level of redundancy error correction coding is added to the 56 row×5952 column matrix of user data. The C2 error correction coding scheme comprises a known Reed-Solomon error correction coding scheme. An interleave used by the C2 redundancy coding scheme may be one C2 symbol every 32 first codewords ie one C2 symbol every 32 rows of 186 bytes of user data, or equivalently, one C2 symbol every 5952 bytes of user data. The C2 redundancy coding is based on a Reed-Solomon code (64,56,9). Reed-Solomon coding is well known in the prior art. In step 1104, the data set with added C2 redundancy coding is converted into a second matrix format having 186 columns and 2048 rows. Where a second redundancy coding C2 having 12.5% redundancy is utilized, 256 rows of data may comprise the C2 redundancy coding data, the data set comprising 1792 rows. In step 1105, first redundancy coding C1 is applied to the second data matrix. The first redundancy coding is applied orthogonally to the second redundancy coding. That is to say, a first codeword intersects a second codeword just once, and there is only one common byte between them. Each first codeword consists of 186 bytes of processed user data, followed by six bytes of C1 redundancy coding symbols or 186 bytes of C2 coding and 6 bytes of C1 coding. The C1 redundancy coding is based on a Reed-Solomon code of (192,186,7).

In step 1106, the two dimensional data frame comprising the data set having first and second redundancy coding added, is partitioned into a plurality of logical track blocks. The data frame is divided into 64 equal logical track blocks of data. This equates to 32 first codewords in each track block or one C2 symbol from each C2 codeword in each track block. In step 1107, the first codewords in the track blocks are interleaved in pairs. This transformation is performed by taking two consecutive codewords at a time, and interleaving them together into one pair of first codewords. This results is 16 first codeword pairs per track block. In step 1108, headers are added to the track blocks and to each of the first code word pairs within the track blocks. The headers are used to contain positional information and identification of the attached data recorded in the track block. In step 1109, the plurality of track blocks are allocated to physical tracks in such a way that an nth track block is allocated to a track P where $$P = n|M|$$

and M is the number of logical data tracks per physical track block set.

Figure 12:
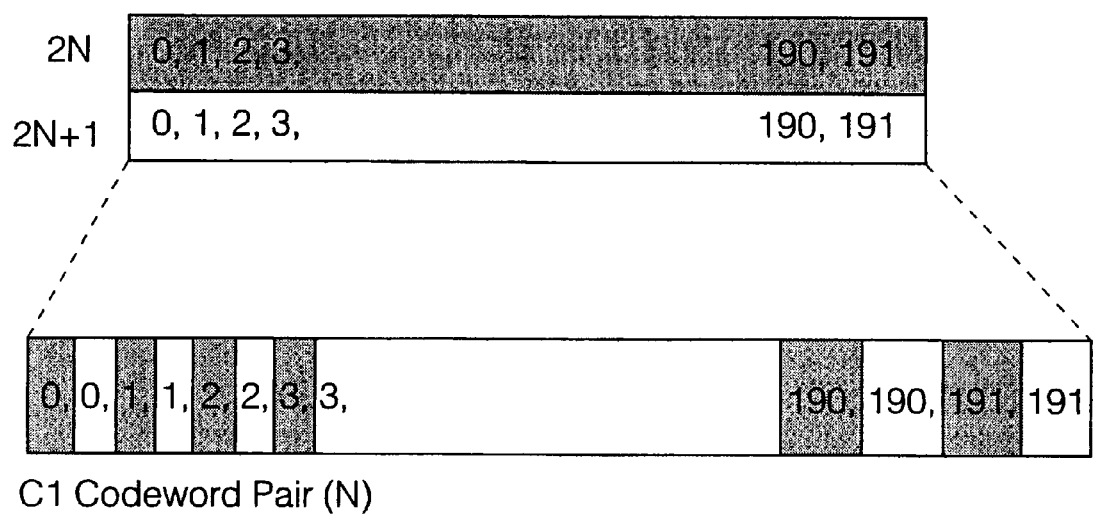
FIG. 12 illustrates an interleaving of codewords in a track block.

Referring to FIG. 12 herein, there is illustrated in further detail an interleaving of first codewords in the track block. The first codewords (C1 codewords) in a track block are grouped in pairs, so that codewords 0 and 1 go together, then 2 and 3, and so on. Symbols, i.e., bytes, from each codeword are interleaved so that there is one byte from codeword 0 then one byte from codeword 1, then another from codeword 0 and so on. This grouping is referred to herein as a codeword pair.

Figure 13:
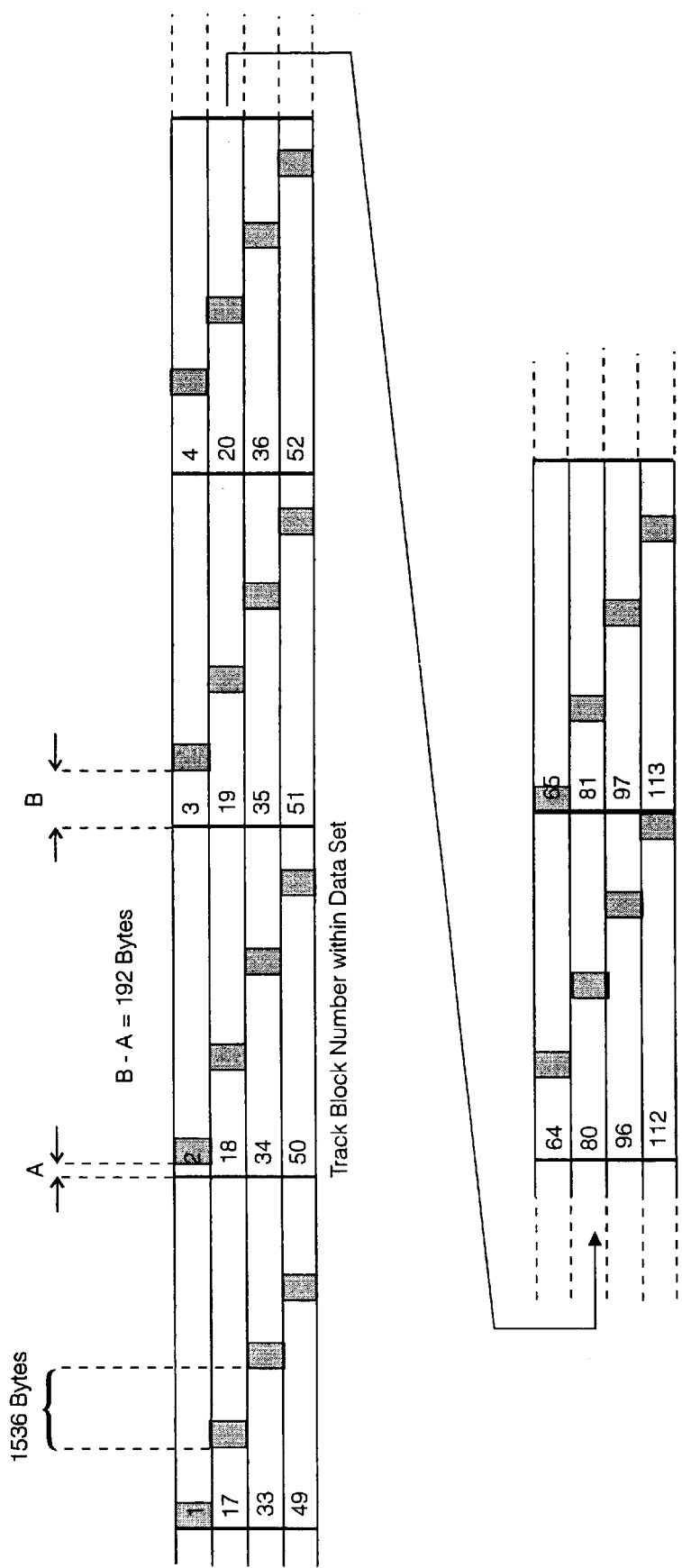
FIG. 13 illustrates a pattern of rotated first codewords in a data set enabling staggering of bytes of a second codeword along a length of tape.

Referring to FIG. 13 herein, there is illustrated in further detail step 1109 of recording logical track blocks to physical data tracks, where successive bytes of a second codeword are staggered with respect to their position in the physical track block, similarly as illustrated with reference to FIG. 9 herein. A sequence in which the first codeword pairs appear in each track block is defined as follows.

A first C1 codeword pair in track block T has a codeword identifier number: T*17.

The nth first codeword pair (counting from 0) has a codeword identifier number: T*16+T+n(MOD16).

This has the effect of presenting the first codewords that contain symbols from any specific second codeword in a diagonal line across the tape, rather than in a vertical line across the tape.

What is claimed is:

1. A method of applying data including redundancy coding to a tape, comprising the steps of:

forming plural track blocks in a data frame by arranging a byte stream of data into a data set, each track block comprising plural complete first codeword pairs;

applying redundancy coding to said data set to obtain a corresponding data frame;

distributing said redundancy coding of said data frame over said plural track blocks within the data frame;

distributing said data frame across a plurality of physical tracks on said tape;

arranging said data frame so it comprises plural first codewords arranged in a first dimension on the tape and plural second codewords arranged in a second dimension on the tape;

writing each track block along a single corresponding physical track on the tape; and distributing bytes of each of second codewords of said data frame over said plural track blocks such that said distributed bytes of the second codewords extend over said plural physical tracks.

2. The method of claim 1, wherein said step of distributing redundancy coding comprises:

arranging said data set into a two-dimensional array;

applying a first coding algorithm to said data set in a first dimension to obtain a plurality of said first codewords; and applying a second coding algorithm to said data set in a second dimension to obtain a plurality of said second codewords.

3. The method of claim 2 wherein said step of distributing said redundancy coding comprises:

partitioning said data frame into a plurality of track blocks, each track block comprising a plurality of said first codewords arranged as rows of said data frames so that during a read operation said first codewords are read sequentially as rows of said data frames; and for each second codeword of said data frame, distributing bytes of said second codeword across a plurality of said track blocks of said data frame.

4. The method of claim 1 wherein said step of distributing said redundancy coding comprises:

partitioning said data frame into a plurality of track blocks, each track block comprising a plurality of said first codewords arranged as rows of said data frames so that during a read operation said first codewords are read sequentially as rows of said data frames; and for each second codeword of said data frame, distributing bytes of said second codeword across a plurality of said track blocks of said data frame.

5. The method of claim 4 wherein said track blocks are formed so that for said data set, said redundancy coding comprises plural first codewords and second codewords;

and said redundancy coding distributing step comprises diagonally arranging bytes of said second codewords across a length of said tape.

6. The method of claim 5, further including distributing bytes of said second codeword substantially uniformly over an area of said tape occupied by said recorded data frame.

7. The method of claim 1 wherein said track blocks are formed so that for said data set, said redundancy coding distributing comprises plural first codewords and second codewords;

and said redundancy coding comprises diagonally arranging bytes of said second codewords across a length of said tape.

8. The method of claim 7, further including distributing, bytes of said second codeword substantially uniformly over an area of said tape occupied by said recorded data frame.

9. An encoding apparatus for encoding a byte stream of data, said encoding apparatus comprising:

a data processor for arranging said byte stream into a two-dimensional data array;

an encoder arrangement for encoding said two-dimensional data array with (a) a first redundancy coding in a first of said dimensions and (b) a second redundancy coding in a second of said dimensions;

said encoder arrangement being arranged for: (a) forming a plurality of track blocks having the first and second redundancy coding distributed over said plurality of track blocks within said two-dimensional data array, each of said track blocks comprising a plurality of first codeword pairs, (b) writing each track block along a single corresponding physical track of the tape, and (c) distributing bytes of each of second codewords of said data array over said plurality of track blocks to cause the distributed bytes of said second codewords to extend over said plurality of physical track blocks on the tape.

10. The encoding apparatus of claim 9 wherein the encoder arrangement includes an application specific integrated circuit.

11. A method of storing redundancy coded data in a data storage medium method comprising the steps:

forming a plurality of track blocks in a data frame by arranging a byte stream of data into a data set;

applying redundancy coding to said data set to obtain a corresponding redundancy coded data frame having a plurality of first codeword pairs extending along a first dimension of said data frame and a plurality of second codewords extending in a second dimension of said data frame;

applying said track blocks to physical tracks on said data storage medium such that successive bytes of each said second codeword are recorded across said plurality of track blocks of said data frame so (a) there is one byte of said second codeword per track block, and (b) the bytes are distributed across all track blocks of said data frame and distributed lengthwise and widthwise across the plurality of physical tracks of the tape.

12. A tape storing plural track blocks in a data frame resulting from a byte stream of data being arranged into a data set, each track block comprising plural complete first codeword pairs, and redundancy coding of the data set;

the redundancy coding of said data frame being distributed over said track blocks within the data frame;

the tape comprising plural elongated side-by-side physical tracks over which said data frame is distributed, the tracks being parallel to each other and to elongated edges of the tape;

said data frame being distributed on the tape so it includes plural first codewords arranged in a first dimension in the tracks and plural second codewords arranged in a second dimension;

each track block comprising plural complete first codeword pairs;

each track block being located in a single track on the tape; and bytes of each second codeword of said data frame being distributed over said plural track blocks such that said bytes of the second codewords extend over said plural side-by-side tracks.

13. The tape of claim 12 wherein the bytes of said second codewords are arranged diagonally across a length of said tape.

14. The tape of claim 13 wherein plural bytes of said second codeword are distributed substantially uniformly over an area of said tape occupied by said recorded data frame.

* * * * *